UNITED STATES PATENT OFFICE.

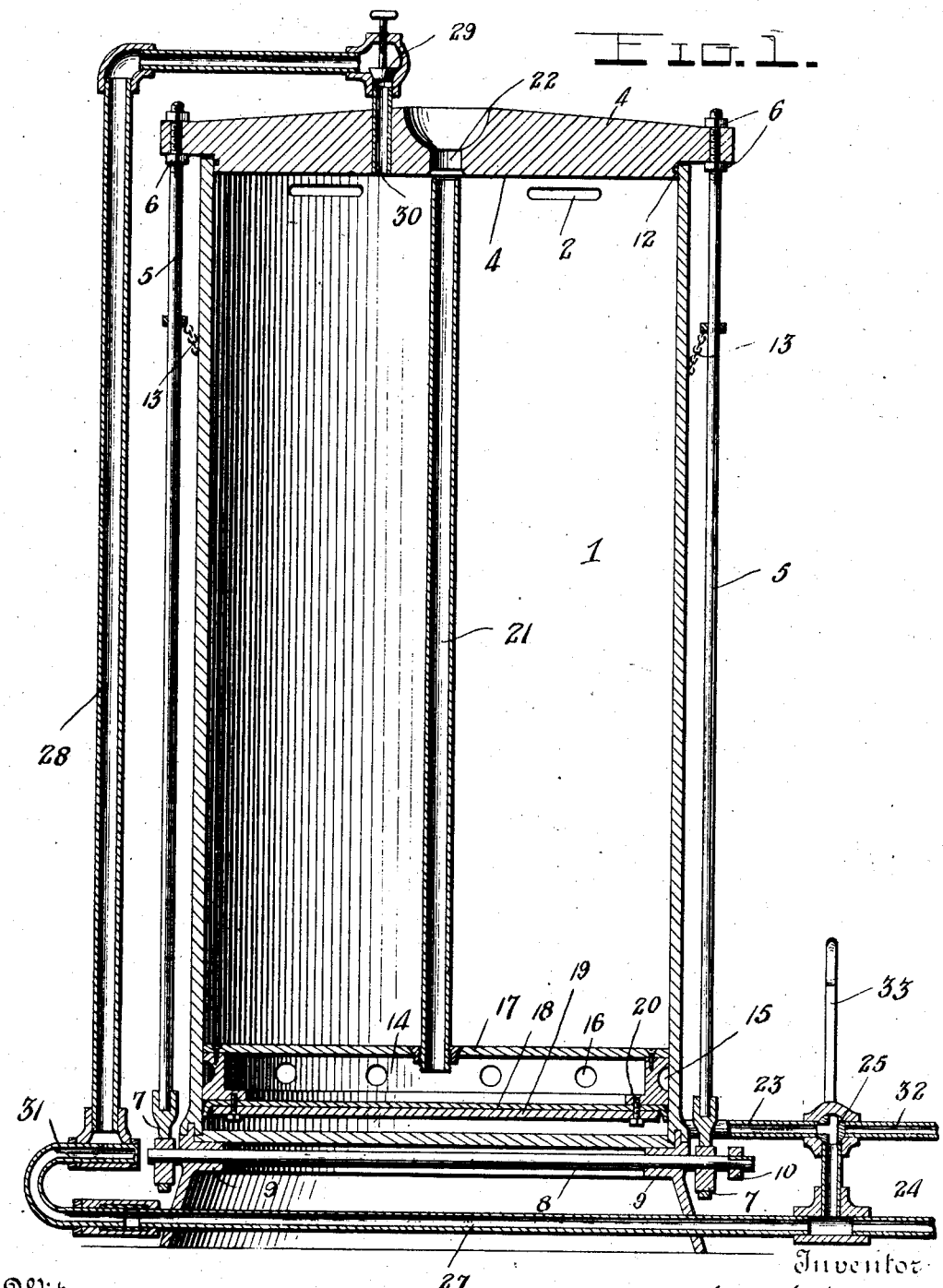

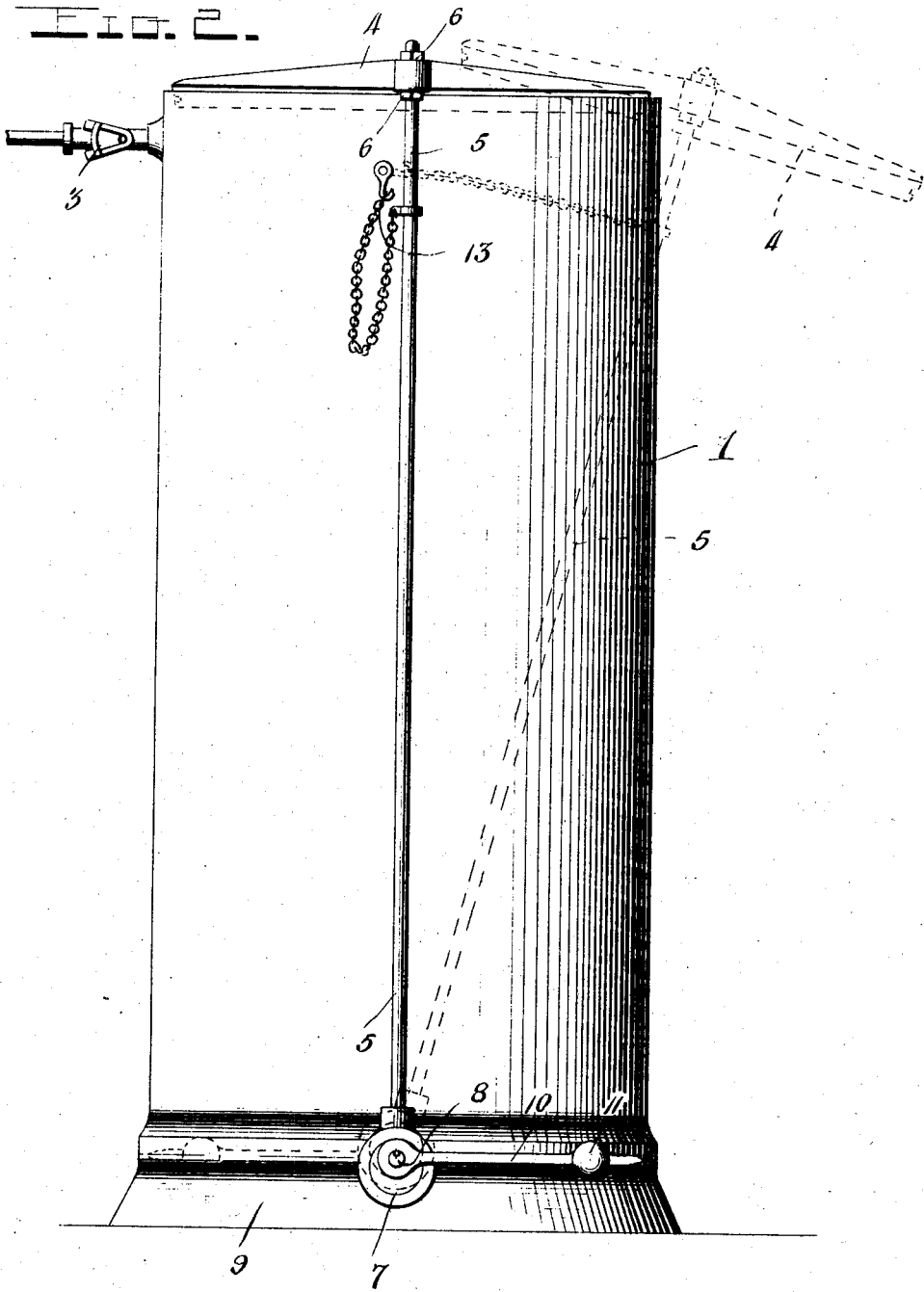

GEORGE REED NAPIER, OF MACON, GEORGIA.

SAUSAGE-STUFFER.

No. 893,808.  Specification of Letters Patent.  Patented July 21, 1908.

Application filed October 24, 1907. Serial No. 398,978.

*To all whom it may concern:*

Be it known that I, GEORGE R. NAPIER, a citizen of the United States, residing at Macon, in the county of Bibb and State of Georgia, have invented certain new and useful Improvements in Sausage-Stuffers; and I do declare the following to be a full, clear, and exact description of the invention, such as will enable others skilled in the art to which it appertains to make and use the same.

My invention relates to a sausage stuffer, adapted to be operated by a fluid medium, preferably compressed air, and has for its object to provide a device which will be simple, strong and efficient and can be easily and quickly controlled and operated at all times.

In the drawings, which illustrate the invention: Figure 1 is a central vertical sectional view of one form of mechanism embodying the invention; Fig. 2 is a side elevation of the same, taken at right angles to Fig. 1, with the pipe connection omitted.

Referring more particularly to the drawings, which are for illustrative purposes and, therefore, are not drawn to any particular scale, 1 indicates a cylinder, which may be of any suitable size and is provided at its upper end with one or more openings 2, through which the contents of the cylinder may be ejected. Ordinary nozzles 3 are provided for these openings through which the contents of the cylinder can be passed to the casings in the ordinary manner.

A lid or cover 4 is provided for the upper end of the cylinder and is preferably manipulated or moved toward and from the top of the cylinder by means of rods 5 which are adjustably connected therewith at their upper ends by means of nuts 6 and have their lower ends connected with eccentrics 7 on a shaft 8. The shaft 8 is journaled in the base 9 of the machine and is provided with a handle 10 by means of which it is rocked for giving the rods 5 a reciprocal movement relatively to the cylinder. As shown in full and dotted lines of Fig. 2, the handle 10 is adapted to be moved through a half-circle and is preferably provided with a weight 11, which will have a tendency to hold it in a horizontal position, but more especially when the lid or cover is in its closed position, as shown in full lines in said figure.

The length of the rods 5 is such that when the eccentric is at its lowest point the lid will be drawn down tightly into the upper end of the cylinder and thereby prevent the escape of any of the contents at that point, the periphery of the cover being preferably beveled, as shown in Fig. 2 or provided with a circumferential groove 12, as shown in Fig. 1. When the shaft 8 is rocked, so as to cause the eccentrics to be moved to their upper position, the cover will be forced upwards so as to clear the top of the casing when it can be moved over to one side, as shown in dotted lines in Fig. 2, to permit of the cylinder being filled. Means are provided, as chains 13, for limiting the lateral movement of the rods and cover when they are thus moved to one side.

Reciprocally mounted in the cylinder is a piston head 14, which is preferably of such a thickness that it is adapted to be moved longitudinally of the cylinder without the need of a piston rod, if desired. The piston is preferably hollow and provided with a circumferential groove 15 which communicates with the interior of the piston by means of perforations 16 and its opposite faces are preferably provided with suitable packing 17 and 18. The packing 18 preferably consists of an annulus of leather or other suitable material which is held in position by a ring 19 and bolts 20.

A hollow piston rod or stem 21 is secured in the upper face of the piston 14 and when the piston is at rest at the bottom of the cylinder, the upper end of the rod 21 stands just below the inner face of the lid or cover 4 and the cover is provided with an aperture 22, through which the piston rod is adapted to be reciprocated as the piston head 14 is moved vertically within the cylinder and through which the motive fluid in the cylinder escapes when the piston reaches the limit of its downward movement.

The lower end of the cylinder is provided with an opening which communicates with the supply pipe 24 by means of a pipe 23 and a 3-way valve 25 and suitable connection 26. The supply pipe also communicates with the interior of the cylinder at the top through pipes 27 and 28, the latter pipe being provided with a valve 29 for controlling the inlet 30. The connection between the inlet 30 and the supply pipe 24 is made flexible, as by means of the flexible coupling 31 to permit of the vertical and lateral movement of the cover. An outlet or exhaust 32 communicates with the valve 25 and the valve is provided with a handle 33 by means of which it may be manipulated to permit the fluid medium to enter or pass out of the cylinder.

In using a sausage stuffer, as above described, the piston 14 is permitted to rest upon the bottom of the cylinder above the inlet 23 and the sausage or other material to be operated upon is placed in the cylinder. The cover is then moved into position above the top of the cylinder and the shaft 8 is rotated so as to draw down the cover and thereby tightly close the cylinder. The valve 25 is then opened so as to permit the fluid medium to enter the bottom of the cylinder and gradually force the piston upward and thereby discharge the contents through the openings 2 and the nozzles 3. If any of the medium should leak past the packing 18, it passes through the groove 15 and openings 16 into the interior of the piston head and then out through the rod 21 which has been forced up through opening 22 in the cover 4. As soon as the piston reaches the limit of its upward movement the valve 25 is rotated so as to open communication between the inlet 23 and the exhaust 32, and the valve 29 is opened which will permit the medium to enter the top of the cylinder and thereby return the piston to its normal position. As soon as the piston reaches the limit of its downward movement the upper end of the rod 21 passes out of the opening 22 and thereby permits the compressed air within the cylinder to escape through said opening, after which the shaft 8 is rotated so as to force the cover vertically upward and permit of its being swung to one side or the other of the top of the casing and thereby permit access being had to the interior of the cylinder for the purpose of filling it or cleansing it. In this manner the piston can be quickly forced downward and the compressed air will be permitted to escape through the cover without the use of extra valves for that purpose.

From the foregoing, it will be seen that the machine can be manufactured very strong and durable, but that it will comprise but few parts and they can be made so simply that the liability of accident or breakage is reduced to a minimum.

Having thus described my invention, I claim:

1. In a sausage stuffer, a cylinder having a cover at its upper end and provided with openings for the ejection therethrough of the contents of said cylinder, nozzles connected with these openings, means for introducing a fluid medium into either end of said cylinder, the cover of the cylinder being apertured, a piston reciprocally mounted in the cylinder and provided with a stem adapted to close said apertures during the upward movement of the piston, the upper end of which is below the aperture in said cover when the piston is at the limit of its downward movement to permit the fluid medium above the piston to exhaust.

2. In a sausage stuffer, a cylinder provided with openings having meat nozzles connected therewith, said cylinder being also provided with means for introducing a fluid medium at each end, the cover of the cylinder being concentrically apertured, a hollow piston reciprocally mounted in the cylinder, a hollow stem communicating with the interior of the piston at its lower end and having its upper end normally standing at a point just below said opening in said cover when the piston is at the limit of its downward movement said piston having an opening in its side wall communicating with a space between the heads thereof.

3. In a sausage stuffer, a cylinder provided with openings having meat nozzles connecting therewith an inlet at its bottom, a cover for the cylinder provided with a fluid inlet, a piston operable in said cylinder between said inlets means for connecting said bottom inlet with a fluid supply pipe and with an exhaust, and means connected with said cylinder for moving said cover vertically relatively to the upper end of the cylinder for closing the same.

4. In a sausage stuffer, a cylinder provided with an inlet at its lower end, a perforated cover for the cylinder provided with an inlet, said inlets being connected with a supply pipe and an exhaust, the connection from the inlet in the cover being flexible, means for moving the cover vertically relatively to the top of the cylinder for opening and closing the same and permitting the cover to be moved laterally, and a piston reciprocally mounted in the cylinder provided with a stem which is adapted to be projected through the opening in said cover.

5. In a sausage stuffer, a cylinder provided with an inlet at its lower end, a perforated cover for the cylinder provided with a valved inlet, a supply pipe and an exhaust, pipes from said inlets to said supply and exhaust, the pipes from the inlet in the cover being provided with a flexible connection, means for positively moving the cover toward and from the top of the cylinder and permitting the same to be moved laterally, and a piston reciprocally mounted in the cylinder provided with a stem adapted to be projected through the opening in said cover.

6. In a sausage stuffer, a cylinder provided with an opening at its lower end, a perforated cover provided with an inlet, a supply pipe and an exhaust communicating with said inlets, a shaft journaled in the base of the cylinder and provided with an eccentric at each end, a handle for rotating said shaft, a rod from each eccentric to the cover and adjustably connected therewith, whereby the cover may be moved vertically by the rotation of said shaft and the cover may be moved laterally, stops for limiting said lateral movement, and a piston reciprocally mounted in the cylinder provided with a stem adapted to be projected through the perforation in said cover.

In testimony whereof I have hereunto set my hand in presence of two subscribing witnesses.

GEORGE REED NAPIER.

Witnesses:
DAVID TODD,
ORA A. CHAPELL.